US012600852B2

(12) United States Patent
Sin Xicola et al.

(10) Patent No.: US 12,600,852 B2
(45) Date of Patent: Apr. 14, 2026

(54) FRICTION MATERIAL AND BRAKE PAD COMPRISING SUCH FRICTION MATERIAL

(71) Applicant: ITT Italia S.R.L., Milan (IT)

(72) Inventors: Agustin Sin Xicola, Frossasco (IT); Mauro Milazzo, Barge (IT); Valentina Iodice, Barge (IT); Finizia Auriemma, Barge (IT); Claudio De Rosa, Barge (IT)

(73) Assignee: ITT Italia S.R.L, Milan (IT)

( * ) Notice: Subject to any disclaimer, the term of this patent is extended or adjusted under 35 U.S.C. 154(b) by 387 days.

(21) Appl. No.: 18/258,526

(22) PCT Filed: Dec. 22, 2021

(86) PCT No.: PCT/IB2021/062181
§ 371 (c)(1),
(2) Date: Jun. 20, 2023

(87) PCT Pub. No.: WO2022/137159
PCT Pub. Date: Jun. 30, 2022

(65) Prior Publication Data
US 2024/0034873 A1 Feb. 1, 2024

(30) Foreign Application Priority Data
Dec. 22, 2020 (IT) ........................ 102020000031967

(51) Int. Cl.
C08L 61/06 (2006.01)
F16D 65/092 (2006.01)
F16D 69/02 (2006.01)

(52) U.S. Cl.
CPC ............ C08L 61/06 (2013.01); F16D 65/092 (2013.01); F16D 69/026 (2013.01);
(Continued)

(58) Field of Classification Search
CPC .......... C08L 61/06; C08L 77/00; C08L 75/04; C08L 77/02; F16D 69/026; F16D 65/092;
(Continued)

(56) References Cited

U.S. PATENT DOCUMENTS 8,863,917 B2* 10/2014 Subramanian ........ F16D 69/026
523/156
2010/0174010 A1 7/2010 Abe et al.
(Continued)

FOREIGN PATENT DOCUMENTS

CN 102199265 A 9/2011
WO 2015133131 A1 9/2015

OTHER PUBLICATIONS

Korean Patent No. KR 20100069097 to Lee published on Jun. 24, 2010.*
(Continued)

*Primary Examiner* — Pamela Rodriguez
(74) *Attorney, Agent, or Firm* — Turk IP Law, LLC

(57) ABSTRACT

A friction material is disclosed for a braking pad comprising a binder comprising a mixture of a phenolic resin or a phenol formaldehyde resin and of a thermoplastic. The total amount of phenolic resin or phenol formaldehyde resin and of thermoplastic is between 2 and 60% in volume of friction material. The ratio in volume between phenolic resin or phenol formaldehyde resin and the thermoplastic is from 20 to 80% in volume. Preferably the thermoplastic has a melting temperature between 120° and 350° C. and comprises a polyamide or a thermoplastic polymer with N-H bond, either in the backbone or in the pendant group. More preferably the thermoplastic material is chosen in the group constituted by PA4, PA6, PA1, PA11, PA12, PA410, PA610, PA66, PA612.

16 Claims, 4 Drawing Sheets

(52) U.S. Cl.
CPC ................ *F16D 2200/0004* (2013.01); *F16D 2200/006* (2013.01); *F16D 2200/0065* (2013.01); *F16D 2200/0073* (2013.01); *F16D 2250/0069* (2013.01)

(58) Field of Classification Search
CPC ....... F16D 2200/0065; F16D 2200/006; F16D 2200/0073; F16D 2200/0004; F16D 2250/0069
See application file for complete search history.

(56) References Cited

U.S. PATENT DOCUMENTS

| | | | | |
|---|---|---|---|---|
| 2015/0275996 | A1* | 10/2015 | Trombotto | ............ F16D 69/026 |
| | | | | 523/157 |
| 2016/0327112 | A1* | 11/2016 | Galimberti | ............ F16D 69/026 |
| 2018/0209501 | A1* | 7/2018 | Galimberti | ............ F16D 55/225 |

OTHER PUBLICATIONS

Chinese Patent No. CN 102199265 to Shen et al.with English translation published on Sep. 28, 2011.*
International Search Report and Written Opinion for International App No. PCT/IB2021/062181, mailed Mar. 11, 2022, pp. 17.
EPO, Search Report, Aug. 8, 2024.

* cited by examiner

Comparison of 1<sup>st</sup> heating of HAP, PA12 and blends uncured samples

Total Pad Wear x 1000 stops
(mm)

600

602
MIX A BINDER
(RESIN AND THERMOPLASTIC WITH 20% -
80% VOLUME THERMOPLASTIC)

604
MIX BINDER WITH THREE OR MORE OF
FIBERS, ORGANIC FILLER, LUBRICANT,
FRICTION MODIFIER, ABRASIVE,
INORGANIC FILLER, POWDER METAL
(2% - 60% VOLUME BINDER)

606
FORM BRAKE PAD FROM MATERIAL

FRICTION MATERIAL AND BRAKE PAD COMPRISING SUCH FRICTION MATERIAL

CROSS-REFERENCE TO RELATED APPLICATIONS

This patent application is a U.S. National Stage filing under 35 U.S.C. § 371 of International Application PCT/IB2021/06218, filed Dec. 22, 2021, which claims priority from Italian patent application no. 102020000031967 filed on Dec. 22, 2020, the entire disclosures of which are incorporated herein by reference.

TECHNICAL FIELD

This disclosure relates to a friction material and to a brake pad comprising such friction material.

The friction material in this disclosure is specifically intended for the manufacture of friction layers/blocks for friction elements such as braking elements, i.e. vehicle brake pads or blocks, and/or friction discs, preferably asbestos free.

PRIOR ART

Wear is the main factor influencing the life span of the friction materials used in braking pads. The wear of the friction material could have different mechanism in function of the working temperatures. At temperatures usually below 300-350° C. there is a binder degradation phenomena through a mechanical deterioration due to the formation of cracks leading to a loss of consolidation in the brake pad material. Another mechanism is the thermal oxidation that happens at high temperatures, above 350° C., this leads to the burning of the binder. The mechanical degradation mechanism is most usual phenomena during normal client driving conditions. When mechanical deterioration appears, particularly on the working surface of the friction material, the life span of the friction material dramatically decreases. Hence it would be desirable to reduce the problem of mechanical deterioration on the working surface. Currently there is no method to deal with this problem, and the only option available would be to repair each single deteriorations such as cracks during the operation conditions of the brake pads.

SUMMARY OF THE INVENTION

The purpose of this disclosure is to provide a friction material and a corresponding brake pad having an improved wear resistance.

The disclosure therefore relates to a friction material and a brake pad.

BRIEF DESCRIPTION OF DRAWINGS

Preferred but not limiting embodiments will be now described in more detail with reference to a number of practical working examples of implementation thereof which are solely intended to disclose in a non-exhaustive and not limiting manner the feature which are part of the content of the present disclosure, and with reference to FIGS. 1 to 6 of the attached drawings, in which.

DETAILED DISCLOSURE

Figure 1:
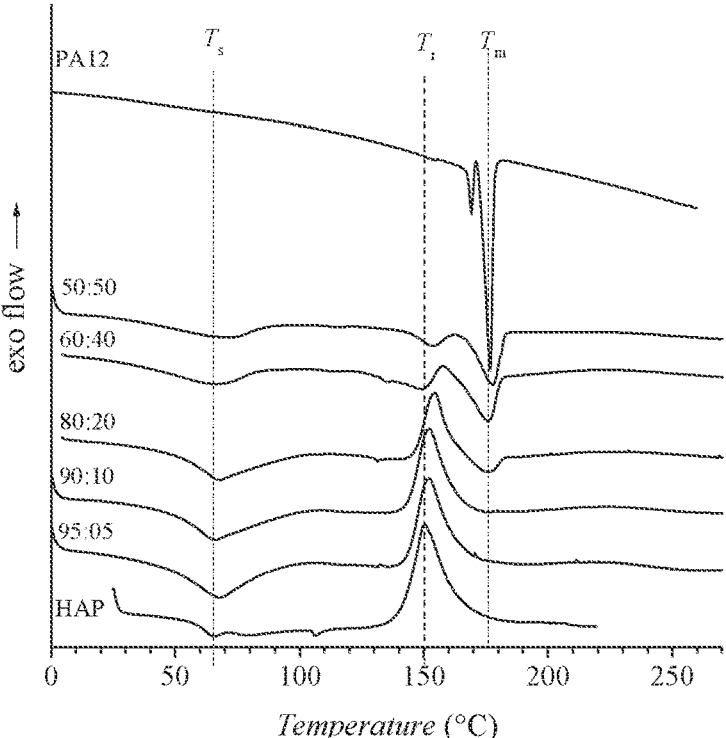
FIG. 1 is a temperature/exo flow graph of a plurality of mixtures related to different embodiments based on a differential scanning calorimetry (DSC) analysis.

In the following detailed description, reference is made to the accompanying drawings, which form a part hereof. The illustrative embodiments described in the detailed description and drawings are not meant to be limiting. Other embodiments may be utilized, and other changes may be made, without departing from the spirit or scope of the subject matter presented here.

In the following the quantities are always given in term of volume with respect of the total volume of a friction material.

In one embodiment the friction material comprises at least four of:

organic and/or inorganic nonmetallic fibers
organic fillers
lubricants
friction modifiers
abrasives
inorganic fillers
fibers/powder metals
binders The above friction material may be used in a braking pad.

Preferably the friction material comprises at least one kind of organic and/or inorganic nonmetallic fibers, at least one kind of binders, at least one kind of organic fillers and at least one kind of friction modifiers.

The friction material is preferably free of copper, its alloys and its compounds, both in powder and fiber form. The friction materials are preferably free of asbestos.

The friction material comprises preferably between 1 and 40% of volume, more preferably between 2 and 20% of volume of organic and/or inorganic fibers.

Preferably the organic and/or inorganic nonmetallic fibers are chosen in the group consisting of glass fibers, rockwool fiber, wollastonite, sepiolite and attapulgite, aramid fibers, polyimide fibers, polyamide fibers, phenolic fibers, cellulose and acrylic fibers or PAN (Polyacrylonitrile) fibers and their mixtures.

The fibers may be used in the form of short fibers or milled fibers. Short fibers have preferably a length of 0.01 to 5 mm, more preferably 0.1-2 mm.

The friction material preferably comprises between 5 and 40% in volume, more preferably 10 and 30% of volume of organic fillers.

The organic filler can be selected preferably in the group consisting of cashew dust, rubber dust, powdered tread rubber, uncured rubber powder, vulcanized rubber powder, thermoplastic powder and their mixtures.

The friction material preferably comprises between 0 and 30% of volume, more preferably between 0 and 20% of volume of lubricants.

The lubricants preferably comprise graphite, more preferably natural or synthetic graphite or others carbon materials.

The friction material preferably comprises between 2 and 30% of volume, more preferably 5 and 25% of volume of friction modifiers.

The friction modifiers can be selected preferably in the group consisting of metal sulfides, titanates, carbons and their mixtures.

The metal sulfides can be selected preferably in the group consisting of molybdenum disulphide, tin sulfide, zinc sulfide, iron and non-ferrous sulfides.

The titanates can be selected preferably in the group consisting of potassium hexatitanates and calcium titanate.

The carbons can be selected preferably in the group consisting of carbon black and coke.

The friction material preferably comprises between 0 and 60% of abrasives, more preferably 5 to 50% in volume.

Non limiting examples of possible abrasives usable in the friction material are silicon carbide, calcium carbonate, alumina, aluminum silicate zirconium silicate, calcium hydroxide, calcium fluoride, iron oxide, zirconium oxide and/or a combination of the above.

Abrasives can be classified in Mild abrasives, medium abrasives and strong abrasives.

Mild Abrasives are defined as "mild" as they have a Mohs between 3 and 5 in the Mohs scale.

Preferably the mild abrasives are present in the friction material in a quantity between 0 and 30% in volume.

Preferably the mild abrasives are chosen in the group consisting of zeolite, dolomite, calcium hydroxide, kaolin, vermiculite and their mixtures.

Medium abrasives are defined as "medium" as they have a Mohs between 5 and 7 in the Mohs scale.

Preferably the medium abrasives are chosen in the group consisting of magnesium oxide, calcium fluoride, calcium carbonate, wollastonite, calcium silicate, iron oxide, chromium oxide, silica, chromite, zinc oxide and their mixtures.

Strong Abrasives are defined as "strong" as they have a Mohs between 7 and 9 in the Mohs scale.

Preferably the strong abrasives are chosen in the group consisting of silicon carbide, zircon sand, zirconium oxide, zirconium silicate, zirconium, corundum, alumina, aluminum silicate, mullite and their mixtures.

The ratio in volume between the friction modifier or lubricant and the abrasives contained in the friction material to be formed is preferably selected between 2:1 and 1:8, more preferably between 1:1 and 1:4.

The friction material preferably comprises between 0 and 15% in volume of inorganic fillers Preferably the inorganic fillers may be chosen in the group consisting of barium sulphate, slaked lime, talc, mica, muscovite, perlite and their combinations. Usually inorganic fillers are chosen between mild abrasives with hardness range of 1-3 Mohs and can be in substitution or in addition to the above mentioned mild abrasives.

The friction material preferably comprises between 0 and 30% in volume of metals preferably in form of powder or fibers.

The metals are preferably in the form of powder and/or fibers chosen in the group consisting of steel, stainless, iron, iron alloys, aluminum, zinc powder and their mixtures.

The friction material preferably does not comprise copper, its alloys and its compounds, both in powder and fiber form.

The friction material preferably comprises between 2 and 60% of volume, more preferably between 10 and 50% of volume.

The binders can be any known binder commonly used in friction materials and in general it comprises at least one thermosetting resin or a mixture of thermosetting resins.

Illustrative but not exhaustive examples of suitable binders include phenolic resins, melamine resins, epoxy resins; various modified phenolic resins such as epoxy-modified phenolic resins, oil-modified phenolic resins, alkylbenzene-modified phenolic resins.

In one embodiment the binder comprises phenolic resin or phenol formaldehyde resin and a thermoplastic, more preferably the binder is entirely made or consists of a phenolic resin or phenol formaldehyde resin and a thermoplastic.

More preferably the total amount of phenolic resin or phenol formaldehyde resin and thermoplastic is between 2 and 60% in volume, more preferably 10 and 30%, in volume with respect to the total volume of the friction material.

More preferably the phenol formaldehyde resin or phenol formaldehyde resin has a formaldehyde to phenol molar ratio of less than one.

Even more preferably the phenol formaldehyde resin is a Novolac.

The thermoplastic is preferably a thermoplastic with a melting temperature comprised between 120° C. and 350° C., more preferably between 200° C. e 250° C.

More preferably, the thermoplastic material comprises a polyamide or a thermoplastic polymer with an N—H bond, either in the backbone or in the pendant group.

More preferably, the thermoplastic material is chosen in the group constituted by polyamide, polyurethane, polyurea, Polyacrylamide, Poly(N-isopropylacrylamide).

Even more preferably the thermoplastic material comprises or is a polyamide.

More preferable the polyamide or the polyamides are derived from amino acids or lactams (—NH—R—CO-)n or from diamine and carboxylic acids (—NH—R—NH—CO—R'—CO-)n.

More preferably the polyamide comprises aliphatic polyamide, even more preferably the polyamide is an aliphatic polyamide.

More preferably the thermoplastic material is chosen in the group constituted by PA4, PA6, PA1, PA11, PA12, PA410, PA610, PA66, PA612.

Where PA is always the acronym for polyamide.

Even more preferably the polyamide is a PA12.

Preferably the optimal ratio in volume between the phenolic resin and the thermoplastic is from 20% to 80% in volume of thermoplastic in phenolic resin, more preferably between 40 and 60% in volume.

It has been verified with several laboratory tests that under the working conditions of braking pads incorporating the friction material as above defined, a reaction between the chosen thermoplastic and the phenolic resin occurs and such reaction results in self-healing of the friction material and consequently in a reduction of mechanical deterioration of binder such as cracks and a prolonged life of the friction material and of the corresponding brake pad.

The examples and comparative examples are reported herein for purposes of illustration and are not intended to limit the disclosure.

Example 1

In the example the following instruments and procedure were followed:

For X-ray diffraction analysis the X-ray powder diffraction profiles were obtained with Ni filtered CuKalfa radiation using an automatic diffractometer X-Pert by Panalytical.

The thermal characterization was carried out by Differential Scanning calorimetry (DSC) with a Mettler-DSC30/2285 differential scanning calorimeter, equipped with a liquid nitrogen cooling system for measurements at low temperature. The scans were recorded in flowing nitrogen atmosphere at heating rates of 10° C./min Specimens of rectangular basal shape (dimensions 50×10 mm2) and thickness of 1 mm were cured in isothermal conditions in a press equipped with heating/cooling plates, under similar conditions, That is a constant pressure of ≈400 kPa, and identical curing time (4 min).

Thermogravimetric (TGA) measurements were performed using a Perkin Elmer Thermogravimetric Analyzer TGA 4000 apparatus in air atmosphere (air flow 20 mL/min), at scanning rate of 10° C./min.

Figure 2:
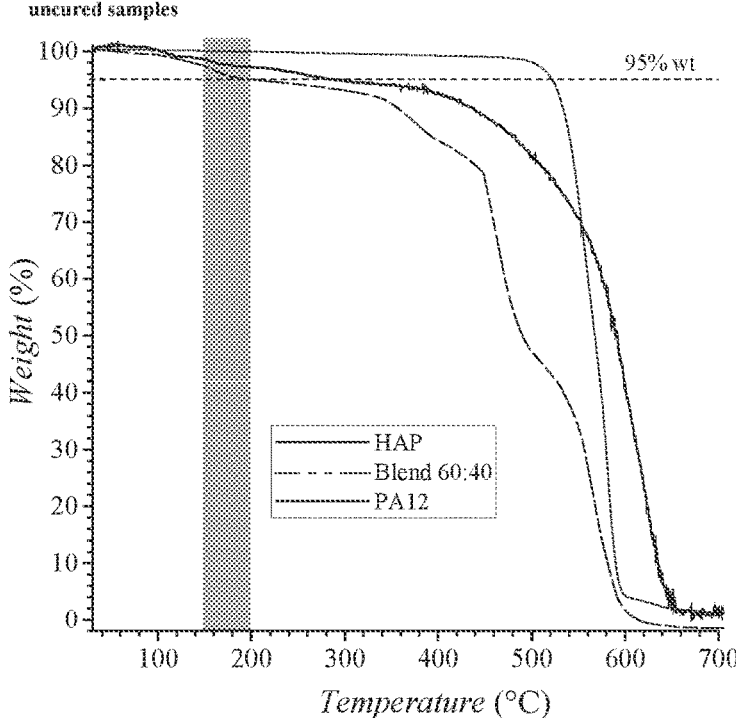
FIG. 2 is a temperature/weight graphs of an embodiment and two comparative examples based on thermogravimetric analysis (TGA)

Sample of mixtures of PA12 and Hexa Adducted Novolac Phenolic Resin (acronym HAP) resin in the percentages shown in the graphs shown in FIGS. 1 and 2 were prepared. FIG. 1 is a DSC graph 100 obtained as above indicated and FIG. 2 is a TGA thermogram 200 obtained as above indicated.

TGA and DSC thermograms 100, 200 of FIGS. 1 and 2 suggest that the use of the combination of at least a thermoplastic and of at least a phenolic resin as above defined in a friction material used in a brake pad may reduce the mechanical deterioration such cracks significantly. In particular, at a temperature of more than 150° C. the thermoplastic melts and reacts with the phenolic resin to repair at least part of the cracks occurring in the brake pad.

In particular, the DSC graph of FIG. 1 shows the lines at different temperatures obtained with different mixtures between PA12 102 and a Novolac phenolic resin 104 as indicated on the graph. It can be seen that mixtures having a PA12 content above 20% in volume disclose an endothermic peak at about 150° C. that may correspond to a reticulation temperature between the PA12 and the Novolac resin. Such reticulation temperature may be connected with the reparation of the cracks occurring in the friction materials.

In the TGA curve 200 of FIG. 2, the blend between polyamide and HAP 202 (dashed line) is placed, by comparison, in the same graph with the TGA curve of resin 204 (continuous line) and thermoplastic 206 (dotted line). The range 150-200 degrees C., marked with a grey area, indicates where the HAP curing takes place. A weight loss occurs at curing temperature of 200° C. (grey area). PA 12 doesn't lose weight, whilst HAP lose 3% of weight. The blend between polyamide and HAP 60:40 loses 5% of weight. If it were a simple physical blend between two materials only two weight loss phenomena would occur and not a major one for the blend. This is a further evidence of the reaction between the two components.

A further compound seems to be present and melts between 350C° and 400° C. The possible new compound begins to degrade before the two materials simply mixed together. This has been interpreted as the different bonding energy present between the C—C (carbon-carbon) links of the resin and the polyamide backbone and the new C—N (carbon-nitrogen) bond formed between polyamide and resin. With a difference in energy of almost 70 kJ/mol it is possible to hypothesize that the bond C—N breaks at lower temperatures.

Examples 2 and 3 and Comparison Example 4

In the following table 1 different formulations of friction materials are summarized. 2 formulations are according to a preferred embodiment and one as a comparative example.

6

TABLE 1

| | Mix 1 % Vol | Mix 2 % Vol | Comparative Example - Reference. % Vol |
|---|---|---|---|
| Organic Fiber | 9 | 9 | 8 |
| Novolac phenolic resin | 20 | 20 | 20 |
| Polyamide 12 | 14 | 18 | 0 |
| Organic fillers | 0 | 0 | 14 |
| Strong Abrasives | 11 | 10 | 11 |
| medium abrasive | 2 | 2 | 2 |
| mild abrasive | 10 | 10 | 10 |
| friction modifier | 18 | 17 | 18 |
| in. Fillers | 7 | 7 | 7 |
| lubricant | 9 | 9 | 9 |

Mix1 and Mix2 contain respectively 40% and 48% of volume of PA12 on the total binder.

The total binder content in the friction material is respectively 34% in volume and 37% in volume.

A wear test is conducted according to SAE J2707 method A in order to analyze the friction wear with the change in temperature in what is known as block versus temperature procedure. The test scheme is reported in table 2 below

TABLE 2

| Section | Initial speed KPH | Initial disc Temp (° C.) | braking deceleration (g) | number of stops |
|---|---|---|---|---|
| Burnish | 50 | 100 | 0.3 | 200 |
| Wear 100 | 50 | 100 | 0.3 | 1000 |
| Wear 150 | 50 | 150 | 0.3 | 1000 |
| Wear 200 | 50 | 200 | 0.3 | 1000 |
| Wear 250 | 50 | 250 | 0.3 | 1000 |
| Wear 300 | 50 | 300 | 0.3 | 500 |
| Wear 350 | 50 | 350 | 0.3 | 500 |
| Wear 400 | 50 | 400 | 0.3 | 200 |
| Wear 100 | 50 | 100 | 0.3 | 1000 |
| Wear 450 | 50 | 450 | 0.3 | 200 |
| Wear 500 | 50 | 500 | 0.3 | 200 |

Figure 3:
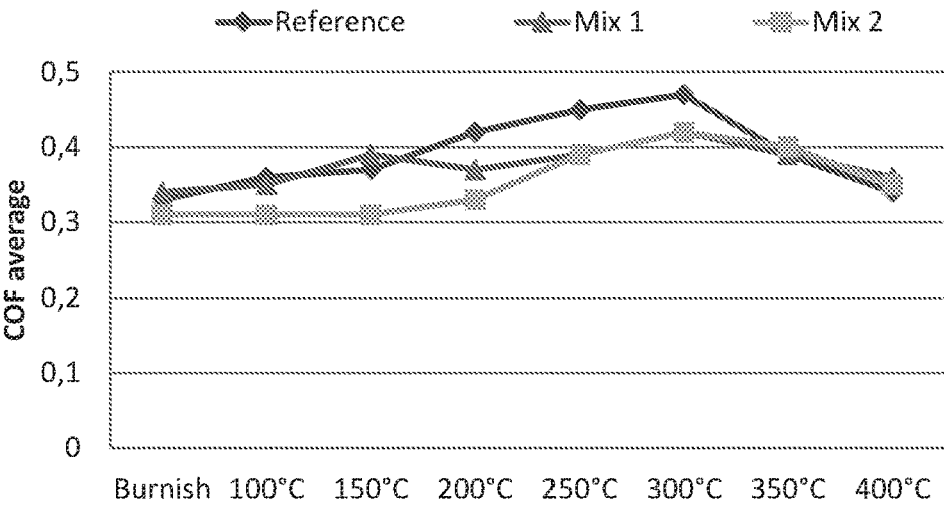
FIG. 3 is a temperature/coefficient graph of friction (COF) average of two embodiments and one comparative example.
Figure 4:
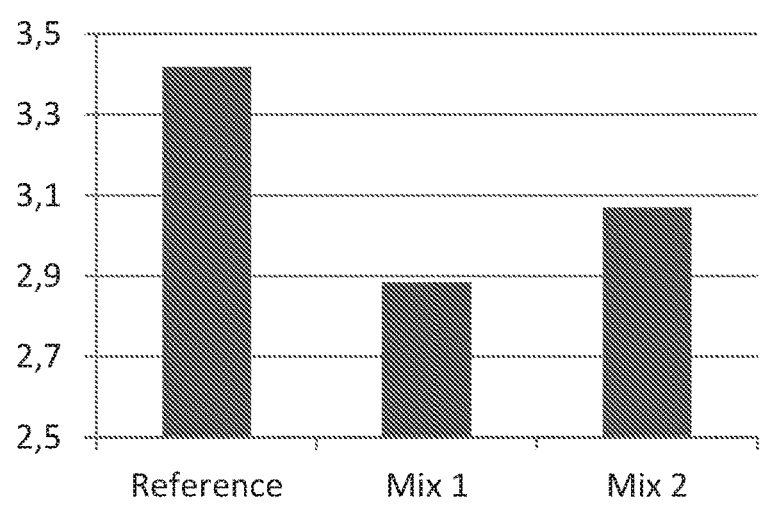
FIG. 4 is a graph of the wear of the two embodiments of FIG. 3 and one comparative example.

FIG. 3 includes graph 300 of COF averages of mixtures (Mix1 304 and Mix2 306) and the comparative reference material 302 over temperature. FIG. 4 includes diagram 400 of total pad wear (for 1000 stops) in mm for mixtures (Mix1 404 and Mix2 406) and the comparative reference material 402.

As diagrams 300 and 400 show, the coefficient of friction of the blend between a phenolic resin and a thermoplastic is lower than without a thermoplastic at different temperatures. Furthermore, the wear is less for both mix1 and mix2 compared to the reference formulation.

Figure 5:
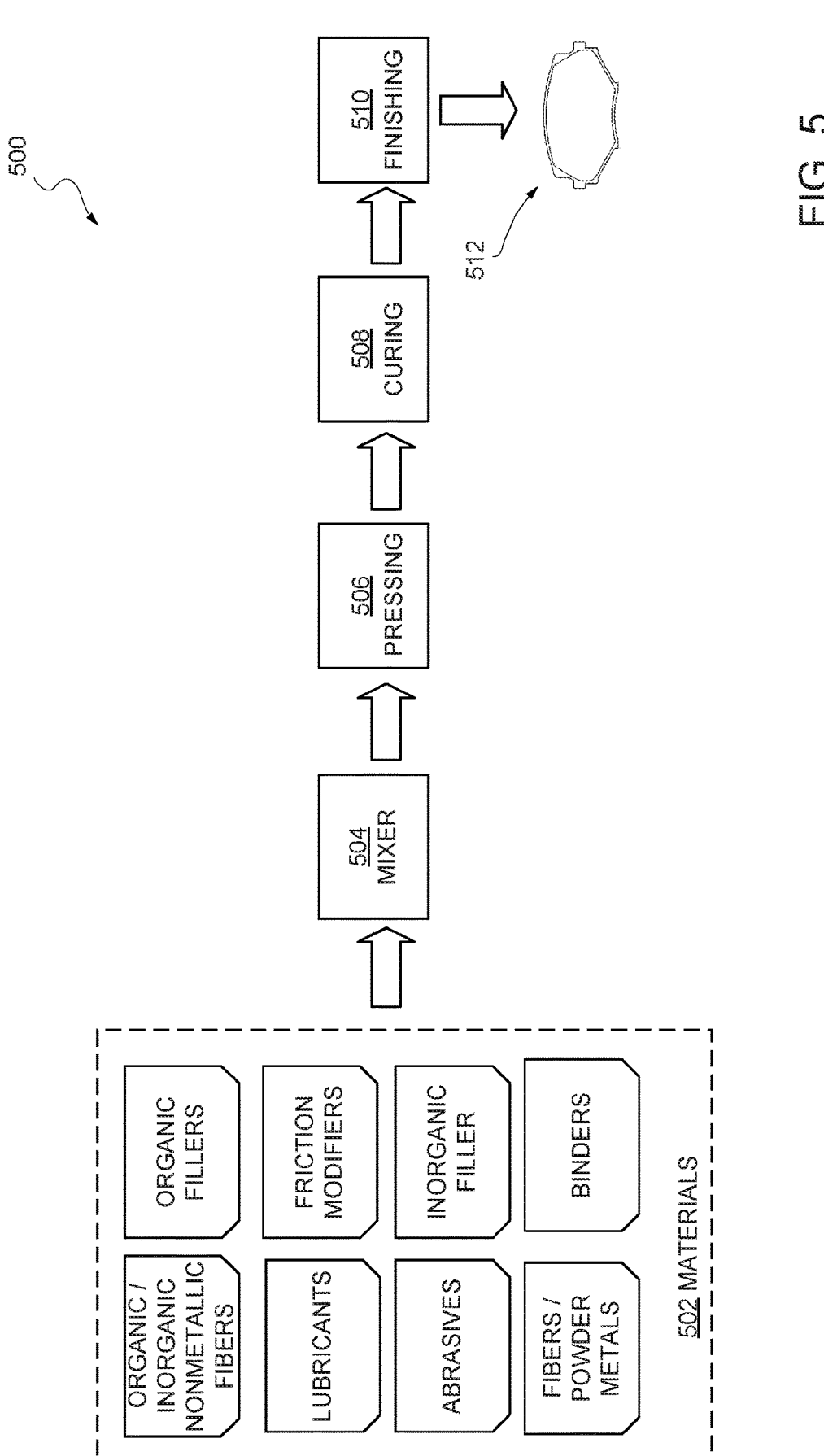
FIG. 5 is an illustration of an example production system of a friction material according to examples.

FIG. 5 illustrates an example production system 500 for a friction material according to examples. As shown in diagram 500, production of the friction material may be divided in different steps:

Mixing (504): mixing of materials 502 may include organic/inorganic nonmetallic fibers, organic fillers, lubricants, friction modifiers, abrasives, inorganic fillers, fibers/powder metals, and/or binders. In some examples, at least four out of the list of materials above may be mixed together. Types and ratios of the various materials mixed by the mixer 504 are described previously. Selected materials 502 may be mixed altogether or in groups, that is, two selected materials may be mixed first and others may be added subsequently to the mixture. The mixing system could be a Loedige®
or a Map® that consist in a plowshares and knives,
them allows to mix all the components in a dry phase.

Hot pressing (506): the mixed material may be processed
to produce brake pads 512. Brake pads 512 may be
formed by hot pressing or comparable techniques 506,
applying pressure and temperature treatments.

Curing (508): after brake pads hot pressing is usually
necessary a curing step in IR and/or convection ovens
508.

Finishing (510): the finishing process could be necessary
after curing, usually consist in grinding and painting.

Figure 6:
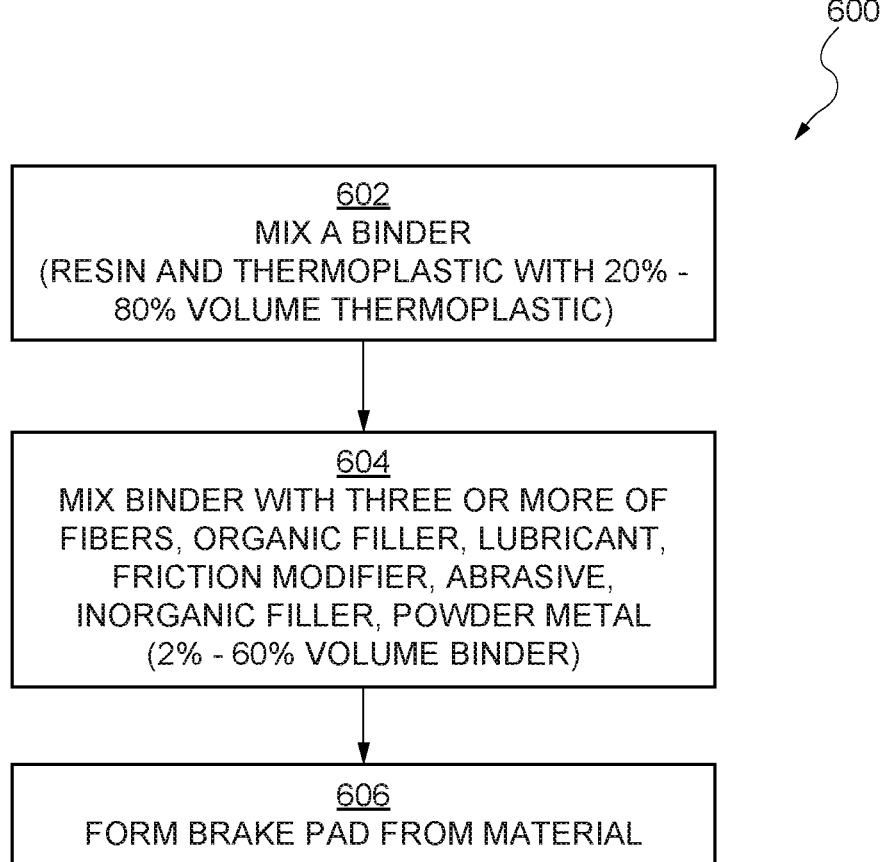
FIG. 6 is a flowchart of an example process for production of a friction material according to examples.

FIG. 6 illustrates a flowchart of an example process for
production of a friction material according to examples. The
described method 600, may include block 602, "MIX A
BINDER (RESIN AND THERMOPLASTIC WITH 20%-
80% VOLUME THERMOPLASTIC)", block 604, "MIX
BINDER WITH THREE OR MORE OF FIBERS,
ORGANIC FILLER, LUBRICANT, FRICTION MODI-
FIER, ABRASIVE, INORGANIC FILLER, POWDER
METAL (2%-60% VOLUME BINDER)", and block 606,
"FORM BRAKE PAD FROM MATERIAL".

An example method may begin with mixing of a resin and
a thermoplastic, where the thermoplastic comprises from
about 20% to about 80% by volume of the mixture, to obtain
a binder. Examples of suitable binders include phenolic
resins, melamine resins, epoxy resins; various modified
phenolic resins such as epoxy-modified phenolic resins,
oil-modified phenolic resins, alkylbenzene-modified pheno-
lic resins. While the binder may range from about 2% to
about 60% by volume of the friction material, in some
examples, the ratio of the binder may be limited to a range
of from about 10% to about 50% by volume in the friction
material. Next, at block 604, the binder may be mixed with
additional materials such as fibers, organic filler, lubricant,
friction modifier, abrasive, inorganic filler, powder metal.
Example types and ratios of these materials are described
above. The additional materials may be mixed altogether or
in groups, that is, two selected materials may be mixed first
and others may be added subsequently to the mixture. At
block 606, brake pads may be formed by pressing, curing
and finishing as described before.

According to some examples, a friction material may
include a binder comprising at least one thermosetting resin,
where the binder is in a range between about 2% and about
60% by volume of the friction material; and at least three or
more from a list consisting of fibers, organic fillers, lubri-
cants, friction modifiers, abrasives, inorganic fillers, and
powder metals. The binder may be selected from a list
consisting of phenolic resins, melamine resins, epoxy resins;
epoxy-modified phenolic resins, oil-modified phenolic res-
ins, and alkylbenzene-modified phenolic resins. The binder
may include a mixture of a phenolic resin or a phenol
formaldehyde resin and a thermoplastic. The thermoplastic
may be in a range between about 20% and about 80% by
volume of the binder. The thermoplastic may be selected
from a list consisting of polyamide (PA), polyurethane,
polyuria, Polyacrylamide, Poly(N-isopropylacrylamide),
and mixtures thereof. The thermoplastic may be selected
from a list consisting of PA4, PA6, PA1, PA11, PA12,
PA410, PA610, PA66, and PA612. The fibers may be
selected from a list consisting of glass fibers, rockwool
fibers, wollastonite, sepiolite and attapulgite, aramid fibers,
polyimide fibers, polyamide fibers, phenolic fibers, cellulose
and acrylic fibers or PAN (Polyacrylonitrile) fibers, and
mixtures thereof. The inorganic fillers may be selected from
a list consisting of calcium carbonate, barium sulphate, magnesium oxide, calcium hydroxide, calcium fluoride,
slaked lime, talc, mica, and mixtures thereof. The friction
modifiers may be selected from a list consisting of metal
sulfides, titanates, carbons, and mixtures thereof. The pow-
der metals may be selected from a list consisting of steel,
stainless steel, iron, iron alloys, aluminum, zinc powder, and
mixtures thereof. The abrasives may be selected from a list
consisting of zeolite, dolomite, calcium hydroxide, kaolin,
vermiculite, magnesium oxide, calcium fluoride, calcium
carbonate, wollastonite, calcium silicate, iron oxide, chro-
mium oxide, silica, chromite, zinc oxide, silicon carbide,
zircon sand, zirconium oxide, zirconium silicate, zirconium,
corundum, alumina, aluminum silicate, mullite, and mix-
tures thereof.

According to other examples, a brake pad for a vehicle may
include a metal back plate; an underlayer; and a friction
material.

According to further examples, a method of preparing a
friction material for a brake pad is described. The method
may include mixing a resin and a thermoplastic to form a
binder, where the thermoplastic is in a range between about
20% and about 80% by volume of the binder; mixing the
binder with at least three or more materials selected from a
list consisting of fibers, organic fillers, lubricants, friction
modifiers, abrasives, inorganic fillers, and powder metals,
where the binder is in a range between about 2% and about
60% by volume of the friction material; and further pro-
cessing the mixture to form the friction material. Mixing the
resin and the thermoplastic to form the binder may include
selecting the resin from a list consisting of phenolic resins,
melamine resins, epoxy resins; epoxy-modified phenolic
resins, oil-modified phenolic resins, and alkylbenzene-modi-
fied phenolic resins. Mixing the resin and the thermoplastic
to form the binder may include selecting the thermoplastic
from a list consisting of polyamide (PA), polyurethane,
polyuria, Polyacrylamide, Poly(N-isopropylacrylamide),
and mixtures thereof. Mixing the binder with at least three
or more materials may include selecting the fibers from a list
consisting of glass fibers, rockwool fibers, wollastonite,
sepiolite and attapulgite, aramid fibers, polyimide fibers,
polyamide fibers, phenolic fibers, cellulose and acrylic fibers
or PAN (Polyacrylonitrile) fibers, and mixtures thereof.
Mixing the binder with at least three or more materials may
include selecting the inorganic fillers from a list consisting
of calcium carbonate, barium sulphate, magnesium oxide,
calcium hydroxide, calcium fluoride, slaked lime, talc, mica,
and mixtures thereof. Mixing the binder with at least three
or more materials may include selecting the fibers from a list
consisting of glass fibers, rockwool fibers, wollastonite,
sepiolite and attapulgite, aramid fibers, polyimide fibers,
polyamide fibers, phenolic fibers, cellulose and acrylic fibers
or PAN (Polyacrylonitrile) fibers, and mixtures thereof.
Mixing the binder with at least three or more materials may
include selecting the friction modifiers from a list consisting
of metal sulfides, titanates, carbons, and mixtures thereof.
Mixing the binder with at least three or more materials may
include selecting the powder metals from a list consisting of
steel, stainless steel, iron, iron alloys, aluminum, zinc pow-
der, and mixtures thereof. Mixing the binder with at least
three or more materials may include selecting the inorganic
fillers from a list consisting of barium sulphate, slaked lime,
talc, mica, muscovite, perlite, and mixtures thereof. Mixing
the binder with at least three or more materials may include
selecting the abrasives from a list consisting of zeolite,
dolomite, calcium hydroxide, kaolin, vermiculite, magne-
sium oxide, calcium fluoride, calcium carbonate, wollas-
tonite, calcium silicate, iron oxide, chromium oxide, silica, chromite, zinc oxide, silicon carbide, zircon sand, zirconium oxide, zirconium silicate, zirconium, corundum, alumina, aluminum silicate, mullite, and mixtures thereof.

The invention claimed is:

1. A friction material for a braking pad comprising:
   a binder, wherein the binder comprises a mixture of:
      a) a phenolic resin or a phenol formaldehyde resin; and
      b) a thermoplastic consisting of a polyamide or a thermoplastic polymer with N—H bond, either in a backbone or in a pendant group and having a melting temperature comprised between 120° C. and 350° C.; and
   at least four of organic and/or inorganic nonmetallic fibers, organic fillers, lubricants, friction modifiers, abrasives, inorganic fillers, or fibers or powder metals.

2. The friction material according to claim 1, wherein a total amount of the phenolic resin or the phenol formaldehyde resin and the thermoplastic polymer is between 2% and 60% in volume of the friction material.

3. The friction material according to claim 1, wherein the ratio in volume between
   a) the phenolic resin or the phenol formaldehyde resin; and
   b) the thermoplastic polymer is from 20% to 80% in volume.

4. The friction material according to claim 1, wherein the thermoplastic polymer has a melting temperature between 200° C. and 250° C.

5. The friction material according to claim 1, wherein the thermoplastic polymer is selected from a group constituted by polyamide, polyurethane, polyuria, Polyacrylamide, Poly (N-isopropylacrylamide) and their mixtures.

6. The friction material according to claim 5, wherein the thermoplastic polymer is selected from a group constituted by PA4, PA6, PA1, PA11, PA12, PA410, PA610, PA66, PA612.

7. The friction material according to claim 6, wherein the thermoplastic polymer is PA12.

8. The friction material according to claim 1, wherein the organic and/or inorganic nonmetallic fibers are selected from a group consisting of glass fibers, rockwool fiber, wollastonite, sepiolite and attapulgite, aramid fibers, polyimide fibers, polyamide fibers, phenolic fibers, cellulose and acrylic fibers or PAN (Polyacrylonitrile) fibers and their mixtures.

9. The friction material according to claim 1, wherein the inorganic fillers are selected from a group consisting of calcium carbonate, barium sulphate, magnesium oxide, calcium hydroxide, calcium fluoride, slaked lime, talc, mica and their mixtures.

10. The friction material according to claim 1, wherein the friction modifiers are selected from a group consisting of metal sulfides, titanates, carbons and their mixtures.

11. The friction material according to claim 1, wherein the abrasives are selected from a list consisting of zeolite, dolomite, calcium hydroxide, kaolin, vermiculite, magnesium oxide, calcium fluoride, calcium carbonate, wollastonite, calcium silicate, iron oxide, chromium oxide, silica, chromite, zinc oxide, silicon carbide, zircon sand, zirconium oxide, zirconium silicate, zirconium, corundum, alumina, aluminum silicate, mullite, and mixtures thereof.

12. The friction material according to claim 1, wherein the lubricants comprise graphite or carbon materials.

13. A brake pad comprising:
   a metal backplate; and
   a friction disposed arranged on the metal backplate, wherein the friction material comprises:
      a binder, wherein the binder comprises a mixture of:
         a) a phenolic resin or a phenol formaldehyde resin; and
         b) a thermoplastic consisting of a polyamide or a thermoplastic polymer with N—H bond, either in a backbone or in a pendant group and having a melting temperature comprised between 120° C. and 350° C.; and
      at least four of organic and/or inorganic nonmetallic fibers, organic fillers, lubricants, friction modifiers, abrasives, inorganic fillers, or fibers or powder metals.

14. The brake pad according to claim 13, wherein
   a total amount of the phenolic resin or the phenol formaldehyde resin and the thermoplastic polymer is between 2% and 60% in volume of the friction material; and
   a ratio in volume between the phenolic resin or the phenol formaldehyde resin and the thermoplastic polymer is from 20% to 80% in volume.

15. The brake pad according to claim 13, wherein the thermoplastic polymer is selected from a group constituted by polyamide, polyurethane, polyuria, Polyacrylamide, Poly (N-isopropylacrylamide) and their mixtures.

16. The brake pad according to claim 13, wherein
   the organic and/or inorganic nonmetallic fibers are selected from a group consisting of glass fibers, rockwool fiber, wollastonite, sepiolite and attapulgite, aramid fibers, polyimide fibers, polyamide fibers, phenolic fibers, cellulose and acrylic fibers or PAN (Polyacrylonitrile) fibers and their mixtures;
   the inorganic fillers are selected from a group consisting of calcium carbonate, barium sulphate, magnesium oxide, calcium hydroxide, calcium fluoride, slaked lime, talc, mica and their mixtures;
   the friction modifier is selected from a group consisting of metal sulfides, titanates, carbons and their mixtures;
   the abrasives are selected from a list consisting of zeolite, dolomite, calcium hydroxide, kaolin, vermiculite, magnesium oxide, calcium fluoride, calcium carbonate, wollastonite, calcium silicate, iron oxide, chromium oxide, silica, chromite, zinc oxide, silicon carbide, zircon sand, zirconium oxide, zirconium silicate, zirconium, corundum, alumina, aluminum silicate, mullite, and mixtures thereof, and
   the lubricants comprise graphite or carbon materials.

* * * * *